United States Patent
Doole et al.

(10) Patent No.: US 12,380,084 B2
(45) Date of Patent: Aug. 5, 2025

(54) DELTA TRANSITION TABLE FOR DATABASE TRIGGERS

(71) Applicant: Salesforce, Inc., San Francisco, CA (US)

(72) Inventors: Douglas Doole, Livermore, CA (US); Simon Y. Wong, San Carlos, CA (US)

(73) Assignee: Salesforce, Inc., San Francisco, CA (US)

(\*) Notice: Subject to any disclaimer, the term of this patent is extended or adjusted under 35 U.S.C. 154(b) by 0 days.

(21) Appl. No.: 18/156,895

(22) Filed: Jan. 19, 2023

(65) Prior Publication Data
US 2024/0086387 A1 Mar. 14, 2024

Related U.S. Application Data

(60) Provisional application No. 63/375,356, filed on Sep. 12, 2022.

(51) Int. Cl.
*G06F 16/22* (2019.01)
*G06F 16/23* (2019.01)
(Continued)

(52) U.S. Cl.
CPC ...... *G06F 16/2282* (2019.01); *G06F 16/2365* (2019.01); *G06F 16/24565* (2019.01)

(58) Field of Classification Search
USPC ........................................................ 707/803
See application file for complete search history.

(56) References Cited

U.S. PATENT DOCUMENTS 6,185,577 B1   2/2001  Nainani et al.
6,233,585 B1   5/2001  Gupta et al.
(Continued)

FOREIGN PATENT DOCUMENTS

WO   2008042980 A3   4/2008
WO   2021225646 A1   11/2021

OTHER PUBLICATIONS

Sanjit K. Kaul; Status Updates Through Queues;IEEE; 2012; pp. 1-6.*

(Continued)

*Primary Examiner* — Ann J Lo
*Assistant Examiner* — Jermaine A Mincey
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to constructing a delta transition table for a database trigger. A computer system may store trigger information identifying a database trigger having a set of routines to be executed after an update operation has been performed on the database table. The computer system may perform a particular update operation that includes updating one or more rows of the database table. As part of performing the particular update operation, the computer system may construct a delta transition table that includes an original version of the one or more rows prior to the particular update operation and an updated version of the one or more rows resulting from the particular update operation. Subsequent to performing the particular update operation, the computer system may make the delta transition table available to the database trigger to facilitate an execution of the set of routines.

15 Claims, 7 Drawing Sheets

(51) Int. Cl.
*G06F 16/24* (2019.01)
*G06F 16/2455* (2019.01)

(56) References Cited

U.S. PATENT DOCUMENTS

| | | |
|---|---|---|
| 6,698,010 B1 | 2/2004 | Yamanouchi et al. |
| 7,512,631 B2 | 3/2009 | Medicke et al. |
| 8,447,745 B2 | 5/2013 | Ahuja et al. |
| 8,548,952 B2 | 10/2013 | Weissman et al. |
| 8,738,590 B2 | 5/2014 | Bezar et al. |
| 8,874,593 B2 | 10/2014 | Unger et al. |
| 8,918,361 B2 | 12/2014 | Wong et al. |
| 8,930,322 B2 | 1/2015 | Weissman et al. |
| 9,053,231 B2 | 6/2015 | Agrawal et al. |
| 9,367,431 B2 | 6/2016 | Unger et al. |
| 9,501,516 B2 | 11/2016 | Driesen |
| 10,649,987 B2 | 5/2020 | Wong et al. |
| 11,397,714 B2 | 7/2022 | Rielau et al. |
| 2002/0184207 A1 | 12/2002 | Anderson et al. |
| 2003/0115178 A1 | 6/2003 | Doole et al. |
| 2003/0154197 A1 | 8/2003 | Millet et al. |
| 2003/0200214 A1 | 10/2003 | Doole et al. |
| 2005/0097149 A1* | 5/2005 | Vaitzblit ............. G06F 16/2358 |
| 2005/0114827 A1 | 5/2005 | Lane et al. |
| 2005/0125371 A1 | 6/2005 | Bhide et al. |
| 2008/0086479 A1 | 4/2008 | Fry et al. |
| 2008/0270368 A1 | 10/2008 | Cotner et al. |
| 2010/0070480 A1 | 3/2010 | Ahuja et al. |
| 2011/0016202 A1 | 1/2011 | Ye et al. |
| 2013/0007069 A1 | 1/2013 | Chaliparambil et al. |
| 2014/0025642 A1 | 1/2014 | Wong et al. |
| 2014/0172889 A1 | 6/2014 | Adam et al. |
| 2015/0278320 A1 | 10/2015 | Bhatnagar et al. |
| 2017/0116321 A1* | 4/2017 | Jain ......................... G06F 16/27 |
| 2021/0342322 A1 | 11/2021 | Rielau et al. |

OTHER PUBLICATIONS

Yoongu Kim; Flipping Bits in Memory Without Accessing Them: An Experimental Study of DRAM Disturbance Errors; 2014;IEEE; pp. 361-372.*

* cited by examiner

*600*

---

Storing Trigger Information That Identifies Database Trigger That Can be Executed to Cause Set of at Least One Instruction to be Executed After Update Operation Has Been Performed on Database Table
610

---

Performing Particular Update Operation That Includes Updating One or More Rows of Database Table
620

The Performing Includes:

Constructing Delta Table That Includes Original Version of One or More Rows Prior to Particular Update Operation And Updated Version of One or More Rows Resulting From Particular Update Operation
625

---

Subsequent to Performing Particular Update Operation, Making Delta Table Available to Database Trigger to Facilitate Execution of Set of at Least One Instruction
630

*FIG. 6*

DELTA TRANSITION TABLE FOR DATABASE TRIGGERS

PRIORITY CLAIM

The present application claims priority to U.S. Provisional App. No. 63/375,356, entitled DELTA TRANSITION TABLE FOR DATABASE TRIGGERS, filed Sep. 12, 2022, the disclosure of which is incorporated by reference herein in its entirety.

BACKGROUND

Technical Field

This disclosure relates generally to database systems and, more specifically, to various mechanisms for implementing a delta transition table for a database trigger.

Description of the Related Art

Modern systems routinely enable users to store a collection of information as a database that is organized in a manner that can be efficiently accessed and manipulated. Those systems often store at least a portion of that information in database tables that are composed of columns and rows in which each column defines a grouping of that information. During its operation, a system can perform database transactions that involve reading and/or writing information with respect to the database. When new information is being inserted into the database, that system may insert that information as a set of records in a database table. In some cases, after updating a database table (e.g., by inserting records), the system executes post-processing routines with respect to that database table. For example, after inserting a set of records into a database table, the system may execute routines to verify that those records store information that is consistent with the intentions of the database table.

BRIEF DESCRIPTION OF THE DRAWINGS

FIGS. 5-6 are flow diagrams illustrating example methods relating to making available a delta transition table to a database trigger, according to some embodiments.

DETAILED DESCRIPTION

Figure 1:
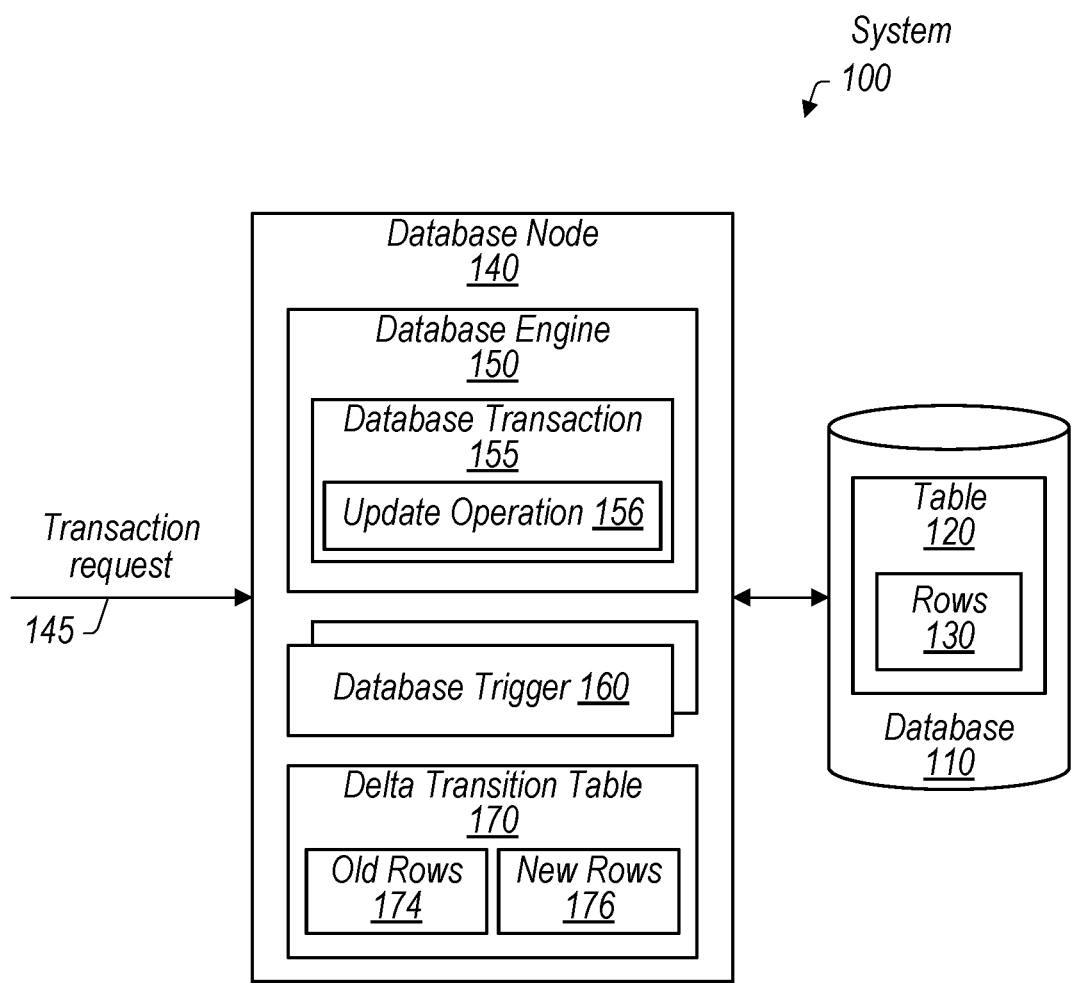
FIG. 1 is a block diagram illustrating example elements of a system that has a database and a database node that can construct a delta transition table for a database trigger, according to some embodiments.

In many cases, a database system allows for database triggers to be defined, stored, and then executed by the database system. As used herein, the phrase "database trigger" (or simply "trigger") is used in accordance with its well-understood meaning and refers to procedural code that is executed before, after, or during a certain event (herein referred to as the "trigger event") that occurs at a database system. For example, a user can define a trigger that performs auditing on rows of a database table that have been updated as a part of the database system executing an update operation (e.g., an SQL UPDATE statement) on the database table. Triggers that are executed before a trigger event are called pre-event triggers, and triggers that are executed after a trigger event are called post-event triggers. Triggers can further be referred to based on the trigger event associated with the triggers—e.g., a trigger executed after an update operation is referred to as a post-update trigger.

To facilitate the execution of a trigger, a database system often supplies the trigger with access to the original values that were present before the trigger event (referred to as the "old" values) and/or the updated/new values that are present after the trigger event (referred to as the "new" values). As an example, for an insert operation that inserts one or more new rows into a database table, a post-insert trigger associated with the database table may be provided with access to those new rows. It is not uncommon for a trigger to compare the old and new values for each row that is modified by an update operation. To provide that trigger with those values, conventional approaches involve the database system creating separate old and new transition tables that include the old and new values, respectively, and then making those transition tables available to the trigger. Those transition tables, however, are not naturally ordered and as a result, an old row and its corresponding new row may not reside in the same position within their respective table. Consequently, in order to pair up an old row with its corresponding new row, a trigger has to either execute a join operation on the old and new transition tables or execute separates queries on those tables, ordering the queries in such a way that rows can be paired using the trigger's logic, which adds complexity to that trigger. In both cases, it is computationally expensive and there are requirements that 1) there be one or more columns whose values can be used to uniquely identify a row and 2) that those columns do not change as a result of the update operation. This disclosure addresses, among other things, the problem of how to provide a trigger with the old and new values that are associated with a database operation without some or all of the above drawbacks.

The present disclosure describes various techniques for implementing a delta transition table (or simply, "delta table") that provides the old and new values in a single table. In various embodiments described below, a system includes a database and a database node that reads and writes data with respect to the database. The database node may receive trigger information identifying a trigger having a set of routines to be executed after an update operation has been performed on an associated database table of the database. During operation, the database node may receive a request to perform an update operation that involves updating a set of rows of the database table. As a part of performing the update operation, in various embodiments, the database node constructs a delta transition table having an original version of the set of rows present before the update operation and an updated version of the set of rows that resulted from the update operation. To construct the delta transition table, when updating a row, the database node may add the old row and the updated row to the delta transition table—the old and the updated row may be concatenated to create the row that is inserted into the delta transition table. After the update operation has been completed and the trigger is being executed, the database node may provide that trigger with the delta transition table to facilitate the execution of its set of routines.

These techniques may be advantageous over prior approaches as these techniques allow for the old and new rows of an update operation to be paired and made available to a database trigger without the database trigger having to perform a join operation. That is, by building the delta transition table during an update operation instead of having the database trigger perform a join operation, the system saves considerable resources and time as the join operation can be quite expensive. Furthermore, the system does not have to generate and maintain two separate tables to store the old and new rows, respectively, and thus saves additional system resources as a result. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. Within the illustrated embodiment, system 100 includes a database 110 and a database node 140 coupled to database 110. As further shown, database 110 includes a table 120 (having rows 130), and database node 140 includes a database engine 150, a set of database triggers 160, and a delta transition table 170 (having old rows 174 and new rows 176). Also as shown, database engine 150 executes a database transaction 155 having an updated operation 156. In some embodiments, system 100 is implemented differently than depicted. For example, system 100 might include multiple database nodes 140, database 110 may store other database objects (e.g., indexes), database transaction 155 may involve other types of database operations (e.g., an insert operation), etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Thus, database node 140 and database 110 may utilize the available cloud resources of the cloud infrastructure (e.g., computing resources, storage resources, network resources, etc.) to facilitate their operations. For example, database node 140 may execute in a virtual environment that is hosted on server-based hardware included in a datacenter of a cloud provider. But in some embodiments, system 100 is implemented utilizing a local or private infrastructure as opposed to a public cloud.

Database 110, in various embodiments, is a collection of information that is organized in a manner that allows for access, storage, and/or manipulation of that information. Database 110 may include supporting software (e.g., storage servers) that enables database node 140 to carry out those operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In some embodiments, data written to database 110 by database node 140 is accessible to other database nodes 140 in a multi-node configuration. In various embodiments, data is stored at database 110 in records that are associated with database tables, such as table 120.

Table 120, in various embodiments, is a database object having a set of data records—that set of data records may be an empty set. Table 120 may store data in an organized structure comprising columns and rows 130, where a column defines a field and a row 130 corresponds to a record that includes one or more values for the columns. A field, in various embodiments, provides structure for table 120 and defines a category of data for which rows 130 of table 120 may provide a value. For example, a field might correspond to usernames and thus a row 130 of table 120 may include a username value for that field/column. In various embodiments, table 120 stores data for multiple users/tenants. Thus, table 120 can include a column defining tenant as a subset of data under which each row 130 specifies a tenant that corresponds to the record represented by that row 130. While database tables are discussed, in some embodiments, other database objects may be used, such as a document in a non-relational database.

Database node 140, in various embodiments, provides database services, such as data storage, data retrieval, and/or data manipulation. In various embodiments, database node 140 is software that is executable on hardware, while in some embodiments, it encompasses both the hardware and the software. The database services may be provided to other components in system 100 or to components external to system 100. As shown, database node 140 can receive a transaction request 145 to perform a set of database transactions 155, which may be received from an application node (not illustrated) via an established database connection, for example. A database transaction 155, in various embodiments, is a logical unit of work (e.g., one or more database operations) to be performed in relation to database 110. As an example, processing a database transaction 155 might include executing a SQL SELECT command to select one or more rows 130 from one or more tables 120. The contents of a row 130 may be specified in a record and thus database node 140 may return one or more records that correspond to the one or more rows 130. Those one or more records may be returned in a transaction response to the issuer of the corresponding transaction request 145.

Database engine 150, in various embodiments, is software that is executable to provide the database services of database node 140, including processing database transactions 155. In various embodiments, database engine 150 processes database transactions 155 in accordance with a set of guiding principles that ensure transactional consistency. One example of a set of guiding principles is ACID (Atomicity, Consistency, Isolation, and Durability). As explained, a database transaction 155 includes one or more database operations. The database operations can include, for example, an insert operation (e.g., a SQL INSERT), a delete operation (e.g., a SQL DELETE), or an update operation 156 (e.g., a SQL UPDATE). An update operation 156, in various embodiments, is an operation in which one or more existing records are updated. As such, to perform an update operation 156, database engine 150 may interact with database 110 to read records (corresponding to rows 130) out of database 110 and to also write records (that correspond to updates to those rows 130) to database 110. In various embodiments, as part of processing a transaction 155, database engine 150 executes a set of user-defined procedures to implement desired functionality. In particular, database node 140 may access a definition of a user-defined procedure, compile it into an executable form, and then execute it. One example of such a procedure is a database trigger 160.

A database trigger 160, in various embodiments, is a set of software routines executable to perform a set of actions before, during, or after a particular trigger event corresponding to a particular table 120. For example, a database trigger 160 for table 120 may execute in response to database node 140 executing a Data Manipulation Language (DML) operation on table 120 as part of a database transaction 155. In various embodiments, a database trigger 160 may be defined in a definition (e.g., a block of code) that is provided to system 100 by a user and then compiled into an executable form. A database trigger 160 may modify data that belongs to its associated table 120 and/or another table 120 specified in its definition. As an example, a database trigger 160 might execute after an update to an employee table 120 but may modify data that is stored in a history table 120. In some embodiments, a database trigger 160 is associated with a certain version of a particular table 120 and thus there might be multiple implementations of the same database trigger 160 but for different versions of the particular table 120. That is, a given table 120 may be associated with different versions, where each version presents a different view of that table 120—for example, a different number of columns may be accessible for different versions. Since the dimensions of a table 120 may be different depending on the version (e.g., due to which columns are visible), each version of that database table may have its own corresponding set of database triggers 160 identified in the table's definition, which may be a part of a database schema that is maintained for database 110. An example of elements that are included in a database trigger 160 is discussed in greater detail with respect to FIG. 2.

Delta transition table 170, in various embodiments, is a database table that includes the old preupdate, original rows 174 and the new, updated rows 176 associated with a database operation. When performing an update operation 156 on table 120, database node 140 may construct delta transition table 170 by inserting (as old rows 174) the original version of the rows 130 of table 120 that are modified by the update operation 156 and (as new rows 176) the updated version of those rows 130 that resulted from the modifications applied by the update operation 156. After delta transition table 170 has been constructed, database node 140 may provide it to a database trigger 160 that may use one or more values of the old rows 174 and/or the new rows 176 in its routines. In various embodiments, delta transition table 170 is a "virtual" database table that is not persisted within database 110 but instead is discarded after its use. But in some embodiments, delta transition table 170 may be persisted so that it can be accessed and used at a future time. An example of constructing a delta transition table 170 is discussed in greater detail with respect to FIG. 3.

Figure 2:
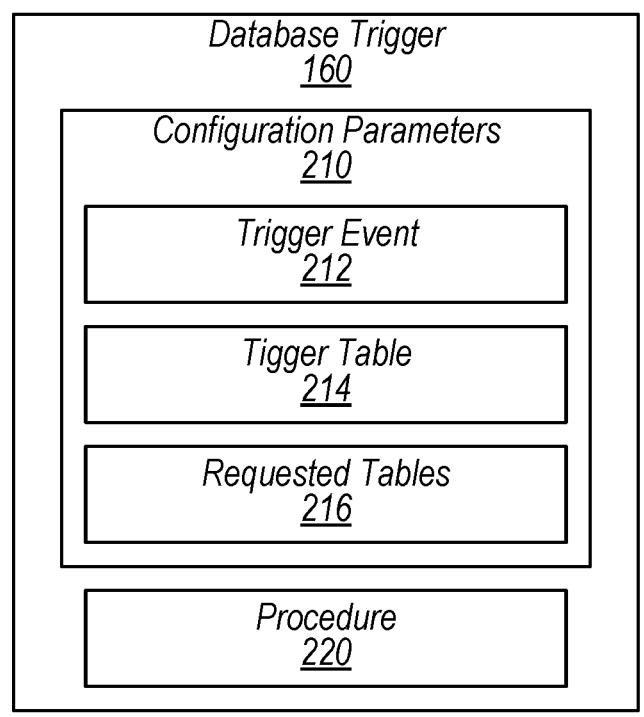
FIG. 2 is a block diagram illustrating example elements of a database trigger, according to some embodiments.

Turning now to FIG. 2, a block diagram of an example database trigger 160 is depicted. In the illustrated embodiment, database trigger 160 includes configuration parameters 210 and a procedure 220. As further shown, configuration parameters 210 include a trigger event 212, a trigger table 214, and requested tables 216. The illustrated embodiment may be implemented differently than shown. As an example, database trigger 160 might not specify requested tables 216; instead, one or more default tables (e.g., delta transition table 170) may be generated and then provided to database trigger 160. In various embodiments, database trigger 160 is defined in procedural code that provides one or more values for the illustrated elements as a part of the definition of database trigger 160.

Trigger event 212, in various embodiments, identifies a database event that triggers the execution of procedure 220. Database events can include, for example, the execution of DML, operations (e.g., SQL UPDATE), Data Definition Language operations (e.g., SQL RENAME), Data Control Language operations (e.g., SQL REVOKE), etc. In some cases, multiple trigger events 212 may be defined for database trigger 160. As an example, database trigger 160 might be triggered in response to the execution of an SQL INSERT or DELETE operation. In various embodiments, trigger event 212 also identifies when procedure 220 is executed relative to the database event (i.e., before, after, or during the database event). In some cases, database trigger may be triggered at multiple different times relative to the database event (e.g., before and then after the database event).

Trigger table 214, in various embodiments, identifies a table 120 that is observed with respect to trigger event 212. As an example, trigger table 214 might identify a "user" table 120 and thus procedure 220 may be executed based on an occurrence of trigger event 212 in relation to that "user" table 120. In some cases, trigger table 214 may identify multiple tables 120, each of which might be associated with a different trigger event 212. In some embodiments, trigger table 214 may also specify a version associated with the identified table 120 so that procedure 220 is executed for only database transactions 155 that operate on that version.

Requested tables 216, in various embodiments, identifies one or more tables to be made available to procedure 220. In various cases, requested tables 216 may request delta transition table 170 and thus database node 140 constructs delta transition table 170 when it is determined that database trigger 160 will be triggered by a database operation. In certain cases, requested tables 216 may request an old table that stores old rows 174 or a new table that stores new rows 176. For example, for an insert operation, an associated database trigger 160 might request the new table as old rows 174 may not be relevant to its procedure 220. But delta transition table 170 may be requested for insert and delete operations. In some embodiments, requested tables 216 may also identify tables 120, such as the one associated with trigger event 212 or another table 120.

Procedure 220, in various embodiments, is a set of routines that implements particular functionality desired by a user. For example, consider a database table 120 that stores salaries of a set of employees. Procedure 220 may be defined to verify that salaries stored in that table 120 are not negative values or fall outside of a specified range. Accordingly, when one or more rows 130 are updated and provided to database trigger 160 as new rows 176 in delta transition table 170, procedure 220 may verify that the values of the new rows 176 specified for the salary column are not negative or fall outside of a specified range. In some cases, procedure 220 may invoke another database trigger 160 as a part of its execution.

Figure 3:
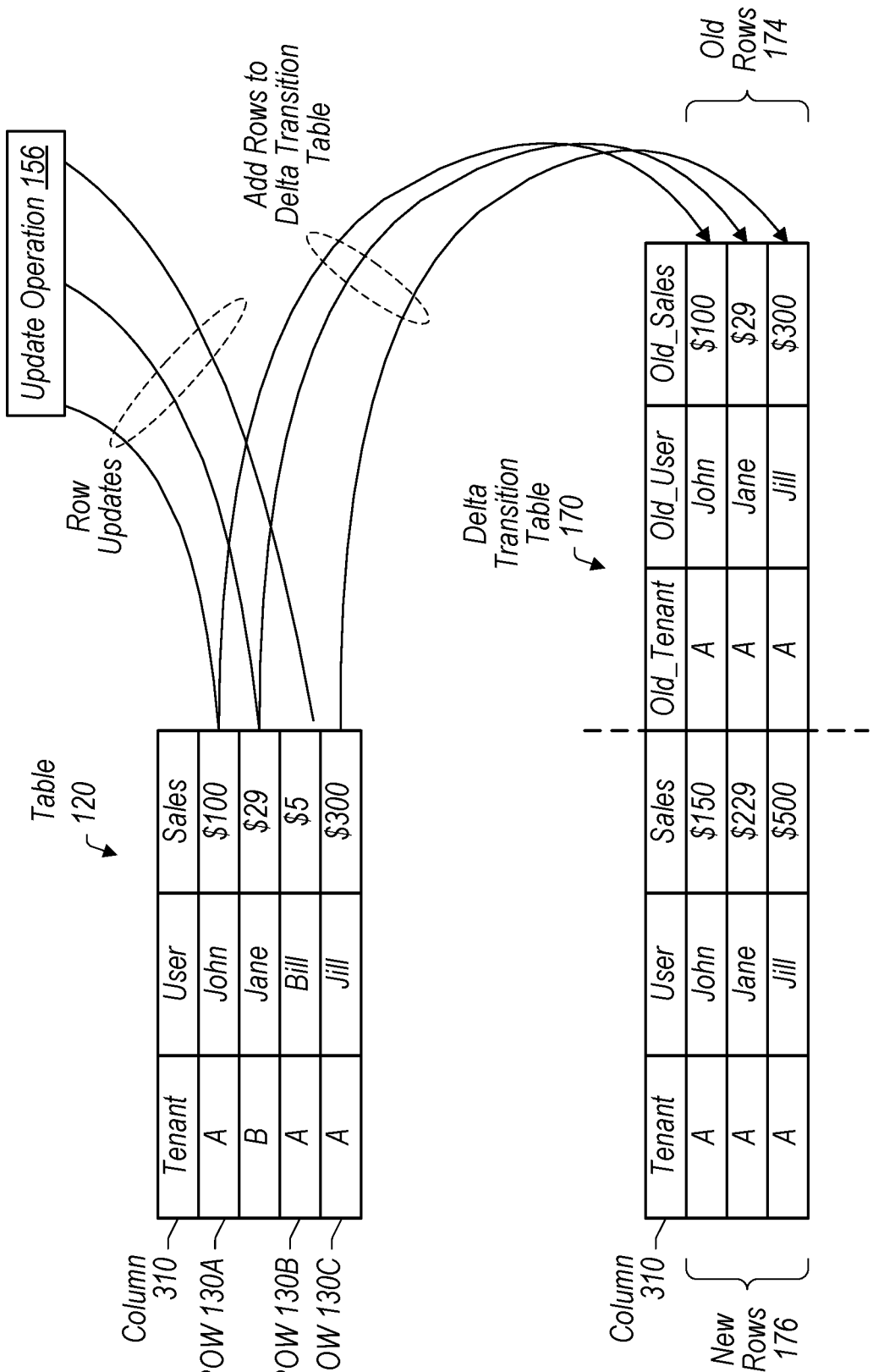
FIG. 3 is a block diagram illustrating example elements of a database node constructing a delta transition table as part of an update operation, according to some embodiments.

Turning now to FIG. 3, a block diagram of an example construction of a delta transition table 170 as part of an update operation 156 is shown. In the illustrated embodiment, there is a table 120 and delta transition table 170. As further illustrated, table 120 includes three columns 310 (i.e., a tenant column 310, a user column 310, and a sales column 310) and four rows 130 that correspond to four different records in database 110. The illustrated embodiment may be implemented differently than shown. For example, another database operation (e.g., an insert operation, a delete operation, etc.) may also cause delta transition table 170 to be constructed by database node 140.

In the illustrated embodiment, update operation 156 involves updating the value under sales column 310 for rows 130A-C. As a part of performing update operation 156, in various embodiments, database node 140 determines whether to construct delta transition table 170 by determining whether table 120 is associated with at least one database trigger 160 that requests delta transition table 170. If there is no such database trigger 160, then database node 140 may perform update operation 156 without constructing delta transition table 170. If there is at least one database trigger 160 that will use delta transition table 170, then it is constructed as a part of update operation 156. In some embodiments, database node 140 constructs delta transition table 170 for each update operation 156 (or other database operation) independent of whether there is a database trigger 160 that will use delta transition table 170.

In some embodiments, database node 140 also determines whether there is at least one property of table 120 that prevents the construction of delta transition table 170. The properties might include too many columns 310, too long of column names, or there being a column 310 with a name that begins with "old_" (or that would otherwise conflict with the name changes applied to certain columns 310 added to delta transition table). For example, database 110 may be associated with a constraint that prevents tables 120 with more than 2000 columns 310 from being created. Since delta transition table 170 includes double the number columns 310 of the base table 120 in various embodiments, if that base table 120 includes more than 1000 columns 310, then delta transition table 170 cannot be constructed as it would include more than 2000 columns 310. In such cases, an error may be thrown so that a user can resolve the issue.

If database node 140 determines that delta transition table 170 should be constructed for update operation 156, then database node 140 may initially provision delta transition table 170 without any rows. Thereafter, in various embodiments, for each row 130 updated in table 120 as part of update operation 156, database node 140 inserts the old version of that row 130 into delta transition table 170 as an old row 174 and the new version of that row 130 as a new row 176. As shown for example, delta transition table 170 stores the old version of row 130A (which includes the value "$100" under the sales column) and the updated version of row 130A (which includes the new value "$150" under the sales column). As part of inserting those rows, database node 140 may concatenated the old row 174 with the new row 176 and then insert the concatenated row into delta transition table 170. After inserting the concatenated row, database node 140 may proceed to update another row 130 of table 120. Thus, delta transition table 170 may be constructed row-by-row as table 120 is updated row-by-row.

In order to enable a database trigger 160 to distinguish between columns 310 of the old rows 174 and columns 310 of the new rows 176, in various embodiments, database node 140 modifies the column names of the columns 310 of the old rows 174 and/or the columns 310 of the new rows 176. As depicted in the illustrated embodiment, the columns 310 of the old rows 174 has been updated to include "Old_" at the beginning of their original name. In some cases, the columns 310 of the new rows 176 may be updated instead (e.g., adding "New_" to the start of their names) or the columns 310 of both the old rows 174 and the new rows 176 may be updated (e.g., adding "Old_" to the start of the names of the columns 310 of the old rows 174 and adding "New_" to the start of the names of the columns 310 of the new rows 176). After delta transition table 170 has been constructed, it may be made available by database node 140 to a set of database triggers 160. In some embodiments, delta transition table 170 includes more than only the rows that have been updated—e.g., delta transition table 170 may include an original version and an updated version of all the rows of the base table 120, even if some of the rows of the updated version did not change from the original version of the base table 120. It is also possible that depending on trigger types, the type of user who created the trigger or other criteria, sometimes a delta transition table may be constructed and other times it is not constructed. As an example, if a particular trigger is rarely implemented except at a specific time of year, it might be a better use of system resources not to create the delta table except when that time of year is reached.

Figure 4:
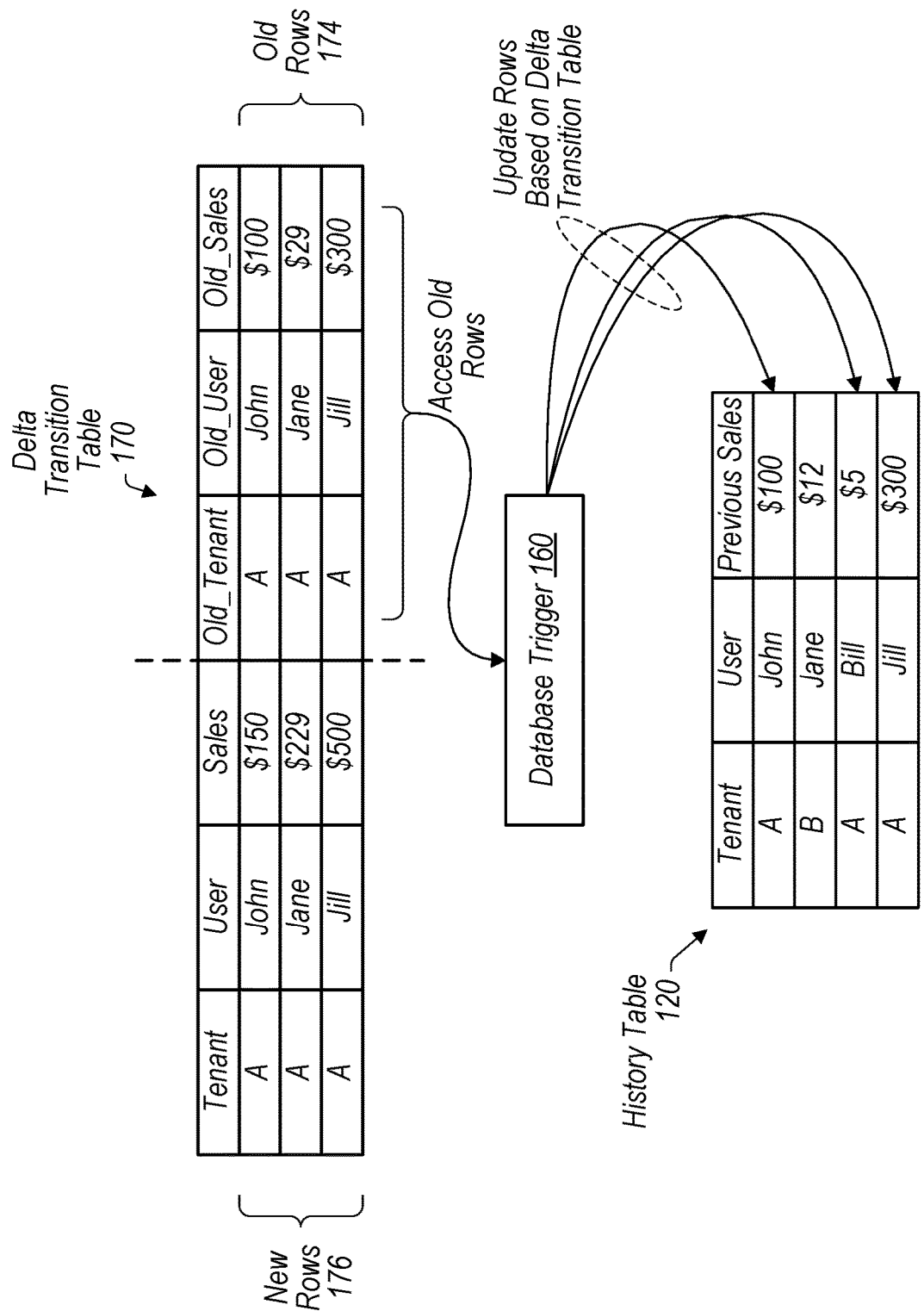
FIG. 4 is a block diagram illustrating example elements of a database trigger utilizing a delta transition table, according to some embodiments.

Turning now to FIG. 4, a block diagram of example that involves a database trigger 160 using a delta transition table 170 to update a "history" table 120 is shown. Within the illustrated embodiment, there is history table 120, database trigger 160, and delta transition table 170. As further shown, the illustrated delta transition table 170 corresponds to the delta transition table 170 shown in FIG. 3 that was constructed as a part of executing an update operation 156. After executing that update operation 156, database node 140 may proceed to execute the procedure 220 of database trigger 160. In the illustrated embodiment, that procedure 220 include updating values under the "Previous Sales" column of history table 120 based on updates made to rows 130 of a related table 120. Accordingly, as shown, database trigger 160 accesses the old rows 174 of delta transition table 170 that store values for the sales column that were updated by the particular update operation 156. Thereafter, database trigger 160 updates the relevant rows of history table 120 based on the old rows 174, as shown. While the illustrated example involves a particular database trigger 160 that uses the old rows 174 of a particular delta transition table 170, other database triggers 160 may uses the new rows 176 or both the new rows 176 and the old rows 174 to facilitate their operation.

Figure 5:
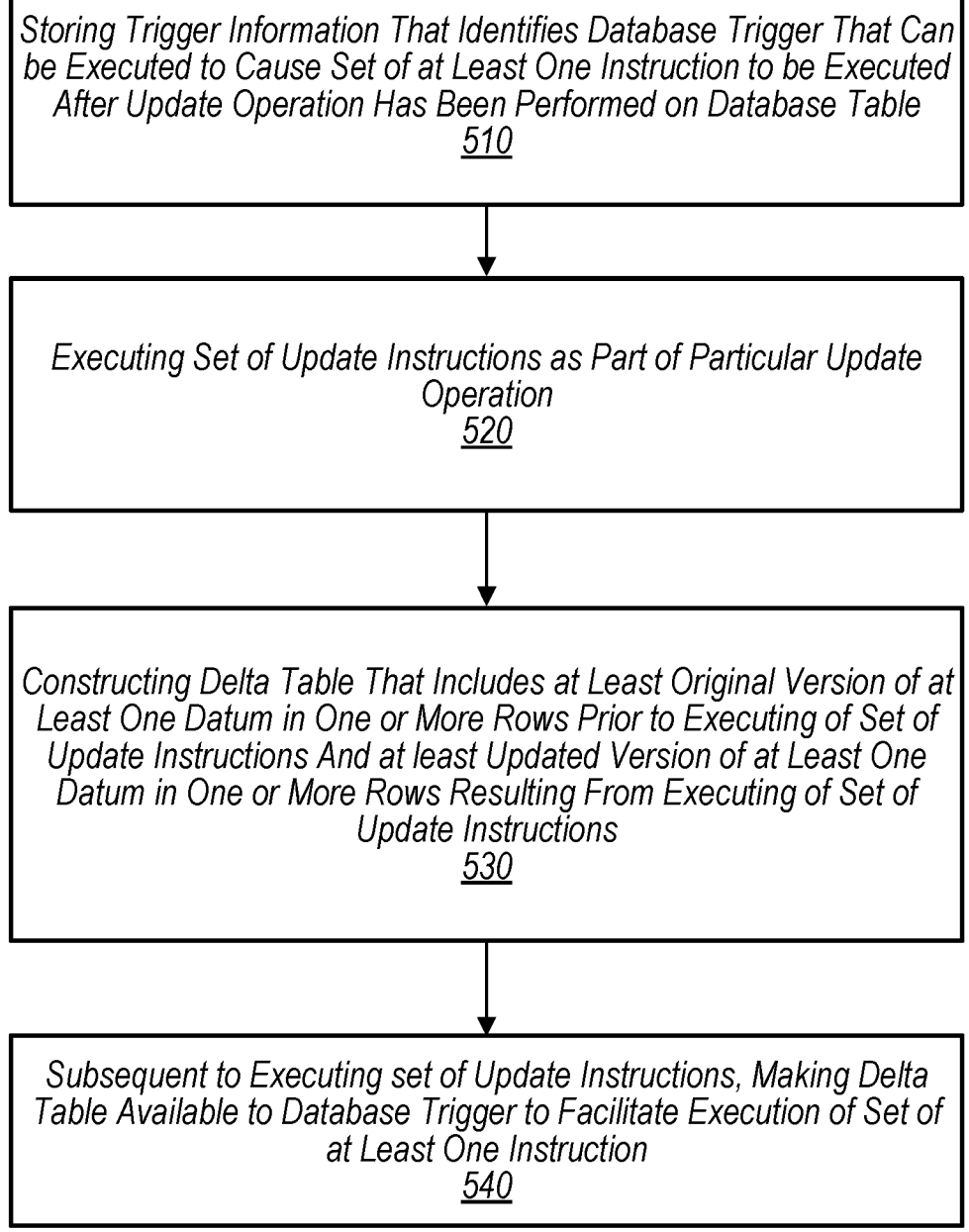

Turning now to FIG. 5, a flow diagram of a method 500 is shown. Method 500 is one embodiment of a method performed by a computer system (e.g., system 100, a database node 140, etc.) to make available a delta table (e.g., a delta transition table 170) to a database trigger (e.g., a database trigger 160). Method 500 may be performed by executing program instructions stored on a non-transitory computer-readable medium. In some embodiments, method 500 can include more or less steps than shown. For example, method 500 may include a step in which the computer system receives trigger information from a user.

Method 500 begins in step 510 with the computer system storing trigger information (e.g., a trigger definition) that identifies a database trigger that can be executed to cause a set of at least one instruction (e.g., a procedure 220) to be executed after an update operation (e.g., an update operation 156) has been performed on a data database table (e.g., a table 120). The data database table may have a pre-execution state before an execution of the set of at least one instruction or a post execution state after the execution of the set of at least one instruction. In step 520, the computer system executes a set of update instructions as part of a particular update operation. The set of update instructions can include updating at least one datum in one or more rows (e.g., rows 130) of the data database table.

In step 530, the computer system constructs a delta table including at least an original version (e.g., old rows 174) of the at least one datum in the one or more rows prior to the executing of the set of update instructions and at least an updated version (e.g., new rows 176) of the at least one datum in the one or more rows resulting from the executing of the set of update instructions. In various embodiments, constructing the delta table includes the computer system, inserting, as a part of updating a first one of the one or more rows, the first row and an updated version of the first row into the delta table before updating a second one of the one or more rows as a part of the particular update operation. The inserting of the first row and the updated version of the first row may include the computer system producing a concatenated row by concatenating the first row and the updated version of the first row and then inserting the concatenated row into the delta table. In various embodiments, the database table includes a set of columns having a set of column names. Accordingly, constructing the delta table may include the computer system associating one of the original version and the updated version with the set of columns having the set of column names and associating the other one of the original version and the updated version with the set of columns but having a different set of column names.

Before constructing the delta table, the computer system may determine whether to construct the delta table by making a determination on whether the data database table is associated with at least one database trigger that requests the delta table. Before constructing the delta table, the computer system may also determine whether the data database table is associated with at least one property that violates a set of criteria for constructing the delta table. The set of criteria may include a criterion that the data database table not have more than a threshold number of columns and a criterion that the column names of the columns of the data database table are not too long (e.g., more than 50 characters). In various embodiments, the delta table is constructed by the computer system without performing a join operation in relation to the delta table.

In step 540, subsequent to executing the set of update instructions, the computer system makes the delta table available to the database trigger to facilitate an execution of the set of at least one instruction. Execution of the set of at least one instruction of the database trigger may cause a different database trigger to be executed, and the computer system may make the delta table available to the different database trigger. In various embodiments, the computer system makes the delta table available to multiple database triggers that are associated with the data database table.

Turning now to FIG. 6, a flow diagram of a method 600 is shown. Method 600 is one embodiment of a method performed by a computer system (e.g., system 100, a database node 140, etc.) to make available a delta table (e.g., a delta transition table 170) to a database trigger (e.g., a database trigger 160). Method 600 may be performed by executing program instructions stored on a non-transitory computer-readable medium. In some embodiments, method 600 can include more or less steps than shown. For example, method 600 may include a step in which the computer system receives trigger information from a user.

Method 600 begins in step 610 with the computer system storing trigger information that identifies a database trigger that can be executed to cause a set of at least one instruction to be executed after an update operation has been performed on a data database table. In step 620, the computer system performs a particular update operation that includes updating one or more rows of the data database table. As part of the performing the particular update operation, in step 625, the computer system constructs a delta table that includes an original version of the one or more rows prior to the particular update operation and an updated version of the one or more rows resulting from the particular update operation. A first one of the one or more rows may be inserted into the delta table after being updated as part of performing the particular update operation but before a second one of the one or more rows is updated. The delta table may be constructed in response to determining that there is a database trigger associated with the data database table that requests the delta table. The computer system may associate the original version with a different set of column names than the updated version so that the database trigger can access the original version and the update version from the delta table. In step 630, subsequent to performing the particular update operation, the computer system makes the delta table available to the database trigger to facilitate an execution of the set of at least one instruction.

While specific techniques have been disclosed to construct the delta table, there may be alternatives depending on usage and trigger types. For example, a delta table may be created that combines delta rows for two or more database tables in a single delta table while tracking which delta rows are from which tables. This may be advantageous if certain common triggers generally use delta rows from a specific set of tables.

Also, delta tables can be constructed by alternative methods. For example, rather than inserting old and new rows, a delta table could be created having the original row value plus the specific amounts of a change to the original values in a row if the changes to an original value are done by performing a mathematical operation on a value. Similarly, the opposite could be done where the rows with new values are inserted along with the inverse values for the mathematical change in a row.

Exemplary Computer System

Figure 7:
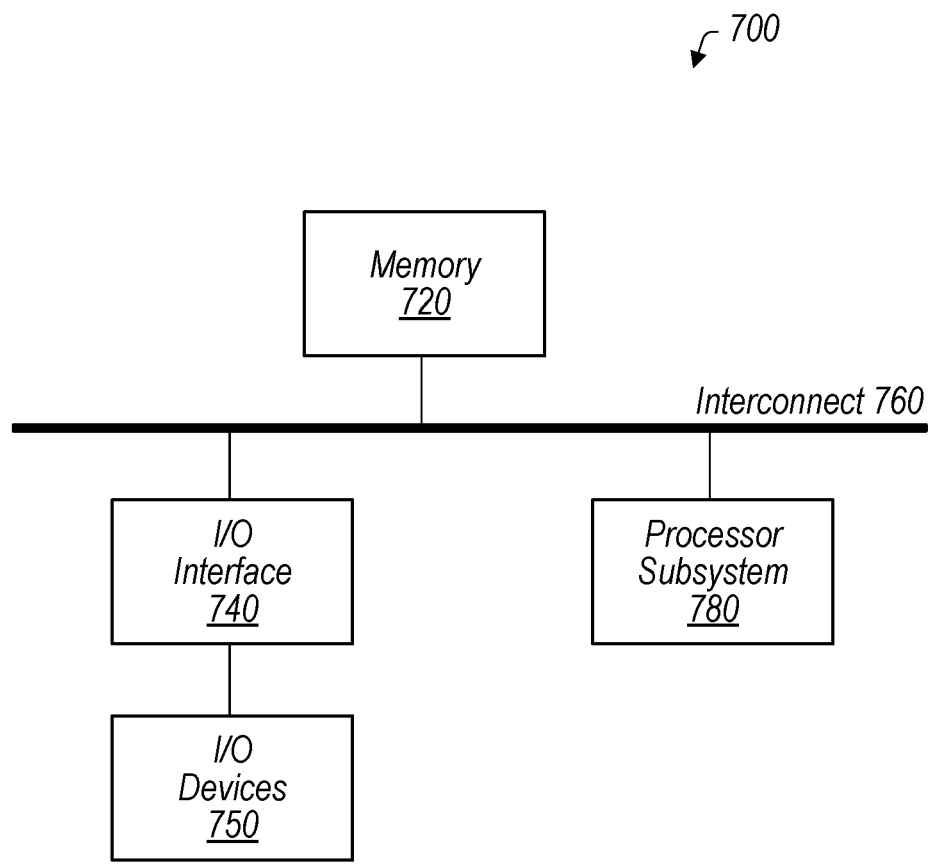
FIG. 7 is a block diagram illustrating elements of a computer system for implementing various systems described in the present disclosure, according to some embodiments.

Turning now to FIG. 7, a block diagram of an exemplary computer system 700, which may implement system 100, database 110, and/or database node 140 is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database engine 150 and/or database triggers 160 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    storing, by a computer system, trigger information that identifies a database trigger that is executable to perform a set of post-processing routines with respect to a particular database table after an update database statement has been executed to update the particular database table;
    executing, by the computer system, a particular update database statement to update at least one value in one or more rows of the particular database table;
    constructing, by the computer system, a delta table that includes at least an original version of the one or more rows prior to the executing of the particular update database statement and an updated version of the one or more rows resulting from the executing of the particular update database statement, wherein the constructing of the delta table includes:
        as a part of updating a first one of the one or more rows, producing a concatenated row by concatenating the first row and an updated version of the first row; and
        inserting the concatenated row into the delta table, wherein the concatenated row is inserted into the delta table before updating a second one of the one or more rows as a part of the executing of the particular update database statement; and
    subsequent to the executing of the particular update database statement, the computer system executing the database trigger with the delta table as an input to the database trigger to enable the set of post-processing routines to access the original and updated versions of the one or more rows using the delta table.

2. The method of claim 1, wherein the particular database table includes a set of columns having a set of column names, and wherein the constructing of the delta table includes:
    associating one of the original version and the updated version with the set of columns having the set of column names; and
    associating the other one of the original version and the updated version with the set of columns but having a different set of column names.

3. The method of claim 1, further comprising:
    before constructing the delta table, the computer system determining whether to construct the delta table by making a determination on whether the particular database table is associated with at least one database trigger that requests the delta table.

4. The method of claim 1, wherein the delta table is constructed by the computer system without performing a join operation in relation to the delta table.

5. The method of claim 1, further comprising:
    before constructing the delta table, the computer system determining whether the particular database table is associated with at least one property that violates a set of criteria for constructing the delta table.

6. The method of claim 5, wherein the set of criteria includes a particular criterion that the particular database table not have more than a threshold number of columns.

7. The method of claim 1, wherein execution of the set of post-processing routines causes a different database trigger to be executed, and wherein the method further comprises the computer system making the delta table available to the different database trigger.

8. A non-transitory computer readable medium having program instructions stored thereon that are capable of causing a computer system to perform operations comprising:
   storing trigger information that identifies a database trigger that is executable to perform a set of post-processing routines with respect to a particular database table after an update database statement has been executed to update the particular database table;
   executing a particular update database statement to update at least one value in one or more rows of the particular database table;
   constructing a delta table that includes at least an original version of the one or more rows prior to the executing of the particular update database statement and an updated version of the one or more rows resulting from the executing of the particular update database statement, wherein the constructing of the delta table includes:
      as a part of updating a first one of the one or more rows, producing a concatenated row by concatenating the first row and an updated version of the first row; and
      inserting the concatenated row into the delta table, wherein the concatenated row is inserted into the delta table before updating a second one of the one or more rows as a part of the executing of the particular update database statement; and
   subsequent to the executing of the particular update database statement, executing the database trigger with the delta table as an input to the database trigger to enable the set of post-processing routines to access the original and updated versions of the one or more rows using the delta table.

9. The medium of claim 8, wherein the constructing of the delta table includes:
   associating the original version with a first set of column names and the updated version with a second set of column names.

10. The medium of claim 8, wherein the operations further comprise:
   making the delta table available to an additional database trigger to facilitate an execution of a set of processing routines of the additional database trigger.

11. The medium of claim 8, wherein the operations further comprise:
   prior to constructing the delta table, determining whether the particular database table is associated with at least one property that violates a set of criteria for constructing the delta table.

12. A system, comprising:
   at least one processor; and
   memory having program instructions stored thereon that are executable by the at least one processor to cause the system to perform operations comprising:
      storing trigger information that identifies a database trigger that is executable to perform a set of post-processing routines with respect to a particular database table after an update database statement has been executed to update the particular database table;
      executing a particular update database statement that includes updating one or more rows of the particular database table, wherein the executing includes:
      constructing a delta table that includes an original version of the one or more rows prior to the executing of the particular update database statement and an updated version of the one or more rows resulting from the executing of the particular update database statement, wherein the constructing of the delta table includes:
         as a part of updating a first one of the one or more rows, producing a concatenated row by concatenating the first row and an updated version of the first row; and
         inserting the concatenated row into the delta table, wherein the concatenated row is inserted into the delta table before updating a second one of the one or more rows as a part of the executing of the particular update database statement; and
      subsequent to the executing of the particular update database statement, executing the database trigger with the delta table as an input to the database trigger to enable the set of post-processing routines to access the original and updated versions of the one or more rows using the delta table.

13. The system of claim 12, wherein the delta table is constructed in response to determining that there is at least one database trigger associated with the particular database table that requests the delta table.

14. The system of claim 12, wherein the operations further comprise:
   associating the original version with a different set of column names than the updated version so that the database trigger can access the original version and the update version from the delta table.

15. The system of claim 12, wherein the operations further comprise receiving the trigger information from a user.

* * * * *